United States Patent [19]

Franke et al.

[11] 4,404,841

[45] Sep. 20, 1983

[54] OPTICAL COMBUSTION SENSOR SYSTEM

[75] Inventors: Horst Franke, Löchgau; Ernst Linder, Mühlacker; Winfried Moser, Markgröningen; Klaus Müller, Tamm; Franz Rieger, Aalen, all of Fed. Rep. of Germany

[73] Assignee: Robert Bosch GmbH, Stuttgart, Fed. Rep. of Germany

[21] Appl. No.: 344,518

[22] Filed: Feb. 1, 1982

[30] Foreign Application Priority Data

Mar. 28, 1981 [DE] Fed. Rep. of Germany ....... 3112327

[51] Int. Cl.³ .............................................. G01L 23/22
[52] U.S. Cl. ......................................... 73/35; 73/116
[58] Field of Search ................... 73/35, 116; 123/425, 123/435; 356/72, 73.1, 438; 374/131; 250/227

[56] References Cited

U.S. PATENT DOCUMENTS 3,067,610 12/1962 Bockemuehl et al. ................ 73/116
4,313,344 2/1982 Brogardh et al. ............. 374/131 X

*Primary Examiner*—James J. Gill
*Attorney, Agent, or Firm*—Frishauf, Holtz, Goodman & Woodward

[57] ABSTRACT

To determine proper operation of a combustion sensor, and to normalize the output signals derived from a pick-up having a window exposed to the combustion chamber (10) by compensating for soiling, contamination, and loss of transmissivity of the window due to combustion residue, soot, or the like, a reference light source is provided introducing reference light of a predetermined level to the pick-up, for example when no light is generated due to combustoin events. In an internal combustion (IC) engine, the reference light can be energized during stopped condition of the engine, or during portions of the stroke of the engine when no combustion event takes place. Output signals from the pick-up are applied to a variable amplification factor amplifier, the amplification factor of which is first calibrated with a clean light source, and then continuously recalibrated or normalized with respect to its original calibration by changing the amplification factor in accordance with electrical signals derived from sensing of the reference light, so that the actual sensing light will be normalized with respect to the reference. The calibration, itself, can be variable and account for external factors, such as aging or decrease of light output of the light source. The reference light can be introduced by an externally operated incandescent filament or by shining light into a portion of a tubular housing, for example through a glass light guide, and reflecting the reference light into the sensing window which also senses light due to combustion.

18 Claims, 12 Drawing Figures

OPTICAL COMBUSTION SENSOR SYSTEM

Reference to related application, assigned to the assignee of this invention, the disclosure of which is hereby incorporated by reference:

U.S. Ser. No. 214,481, filed Dec. 9, 1890, MULLER, LINDER and MAURER (German P 30 01 711).

The present invention relates to an optical sensor system to sense a combustion process, and more particularly to provide output signals representative of combustion events within the combustion chamber of an internal combustion (IC) engine. The system is particularly adapted for use with a combustion sensor of the type referred to in the referenced application Ser. No. 214,481, filed Dec. 9, 1980, which describes a sensor structure adapted to receive light signals which occur as a result of combustion.

The present invention also relates to a combustion process observation element, and more particularly to the constructional features of such an element to permit its association with a housing structure, for example the cylinder block of an internal combustion engine, to permit observation of the combustion occurring during operation of the engine. The element is particularly suitable to detect unusual combustion conditions, for example upon knocking of the engine, or incipient knocking.

BACKGROUND

It is desirable, frequently, to monitor combustion processes occurring in internal combustione engines, which may be of the Otto type or of the Diesel type, and which use light sensitive elements, which may be supplied with light through a light guide to permit viewing of the actual combustion processes which occur upon ignition of an air-fuel mixture within the combustion chamber of the engine. Preferably, the combustion process should be monitored with respect to time, so that it can be monitored during actual operation of the engine, as the piston within the cylinder reciprocates. Observation may, for example, extend to the temporal and geometric distribution of the flame occuring during combustion; sensing of the ignition instant, sensing of fuel injection or fuel supply process; and, especially, sensing of undesirable or irregular combustion processes.

Irregular combustion may lead to knocking of the engine, Such knocking occurs under certain operating conditions. Knocking, as usually understood, is caused by oscillations within the audible frequency band of the compressed fuel-air mixture which is triggered by a shock wave. The heat transmission to the piston walls and the cylinder walls of the engine is substantially increased during such oscillations. A thermal overload of the surfaces will result, so that knocking should be avoided. For most efficient operation of the engine, however, it is desirable to utilize the working range of the engine to the greatest possible extent and, therefore, the engine should be operated just below the "knocking limit". It is necessary then to have some means which clearly and reliably indicate knocking, or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 214,481, filed Dec. 9, 1980, MULLER et al. This application discloses a sensor which include light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration the light guide with a spark plug of an internal combustion engine; or to place light guides in the cylinder head gasket or seal, for eventual connection to photoelectric transducers.

Sensing physical parameters occurring with the combustion chamber of an IC engine by optical means causes problems: The optical element which faces the combustion, chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

Evaluation circuits which are connected to the optical sensors, for example via opto-electrical transducers, measure absolute light values. The relationship between light occurring upon combustion and sensed output signal depends not only on the generated light but also on the condition of the transmission element. Increasing soiling and contamination, for example due to deposits of soot or other contaminants, will interfere with proper operation of the sensor. Decrease in the light being received by the light sensor, and hence transduced into corresponding electrical signals thus will occur during operation of an IC engine.

THE INVENTION

It is an object to improve the correlation between output signals derived from a combustion event sensor and actual light generated during combustion.

Briefly, a reference light is applied to the pick-up which is coupled to an evaluation circuit which then will evaluate light received both from the reference light source as well as light generated as a consequence of a combustion process in the combustion chamber. The output signal can then be normalized by effecting a comparison to compensate for contamination of the light pick-up element during its exposure to combustion processes. A signal representative of absolute value of light actually generated as a consequence of the combustion process can thus be obtained. The system has the advantage that effects due to contamination, soiling, or other matters inhibiting transmission of light occurring in the combustion chamber to the light-sensitive element are eliminated. The light generated by the light source forming the reference can be determined.

In accordance with an embodiment of the invention, reference light is derived from a light source and projected to a receiver which is spaced with respect to the pick-up, so that light will pass through at least a portion of the space defining the combustion chamber and through any contaminants or deposits which may have become deposited on the window of the pick-up element. In accordance with another embodiment of the invention, the reference light is projected into the pick-up from the outside through a portion thereof, and reflected into the measuring area of the pick-up element as such, thereby providing a reference light signal which, when picked up, will be subject to variations due to the same contamination as light resulting from a combustion event.

In accordance with a preferred embodiment of the invention, the pick-up is supplied with an antechamber in which a light source is located, for example an incandescent filament. The incandescent filament can be so arranged that it irradiates the entire window area of the pick-up or only portions thereof, with other portions being shaded. The shaded portions, then, will have only the sensed light due to combustion events appear thereon, but no reference light, so that an immediate comparison between the reference light emitted by the incandescent filament and the actual measured light can be carried out.

The measured light can be normalized or weighted with respect to the reference light at suitable calibration intervals. If the sensor is applied to an IC engine installed in a motor vehicle, a suitable calibration interval can be during stoppage of the engine, and when no measured light will occur; in accordance with another embodiment of the invention, the calibrating interval can be placed in a time window occurring during the operating cycle of an IC engine, the measuring window—in time—being so positioned that it occurs during a period of time when no measuring light will occur, for example during a stroke of the engine after the combustion or power stroke.

The light which is received by the pick-up is subject to wide swings in level. To be able to handle the substantially wide dynamic level change within the pick-up, a self-calibrating amplifier is preferably used, which has an amplification factor which can vary in dependence on a command value which is so adjusted that the increasing contamination and darkening of the measuring window due to deposits of soot or the like is compensated thereby. In accordance with a feature of the invention, the amplifier is so coupled to an external indicator circuit that when its amplification factor reaches or exceeds a predetermined limit, indicating that the degree of contamination of the pick-up window has reached an intolerable level, an alarm or indicator output is obtained to provide an indication to the operator or user that the sensing pick-up is no longer properly operating or will shortly become inoperative, so that the user will be given an indication output to exchange or clean the pick-up element.

DRAWINGS

FIG. 4b is an end view of the arrangement of FIG. 4a;

Figure 1:
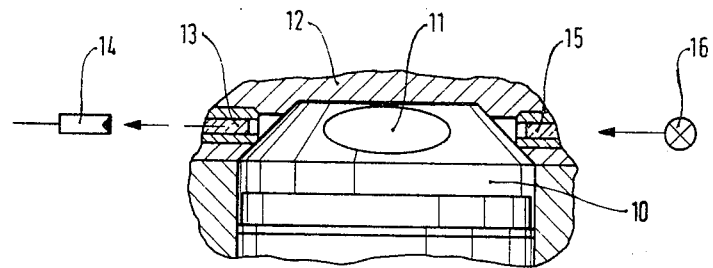
FIG. 1 is a schematic part-pictorial cross-sectional view through the combustion chamber of an internal combustion (IC) engine having a pick-up element and a reference light element, both elements being positioned opposite each other and transversely with respect to the cylinder of the engine.

To calibrate or normalize an optical pick-up with respect to light occurring within a combustion chamber, it is necessary to apply a reference light to the pick-up. The source for the reference light can be located within the combustion chamber, or externally thereto, with the reference light being conducted to the combustion chamber in a way that the pick-up, or at least a portion thereof, will be illuminated thereby, so that a comparison can be carried out between the reference light and the sensed or observed light resulting from a combustion process.

The combustion chamber 10, only generally indicated, is formed for example by the cylinder of an IC engine, such as an Otto motor. A valve opening 11 is formed in the cylinder head 12, closed off by a suitable valve (not shown). An optical pick-up 13 having a light-sensitive element 14 therein, is positioned transversely from a light source 15 including a lamp 16 with respect to the axis of the cylinder in the cylinder head 12. The pick-up 13 senses combustion processes within the combustion chamber 10 by evaluating the light which is generated as a consequence of combustion. The pick-up 13 can be in accordance with any suitable construction, for example as described in the referenced patent application. The pick-up 13 has a window which separates the electrical transducer element 14 or a light guide rod or fiber structure from the actual combustion. The window can become dirty and lose transparency. To be able to reliably measure absolute light values, it is thus necessary to provide a reference light for the pick-up 13. The light source 15 directs light to the pick-up 13. When lamp 16 is illuminated, a reference light signal is applied to the pick-up 13 which can be evaluated in an evaluation circuit—to be described below—and used to normalize or weigh the measured light with respect to the reference light.

Figure 2:
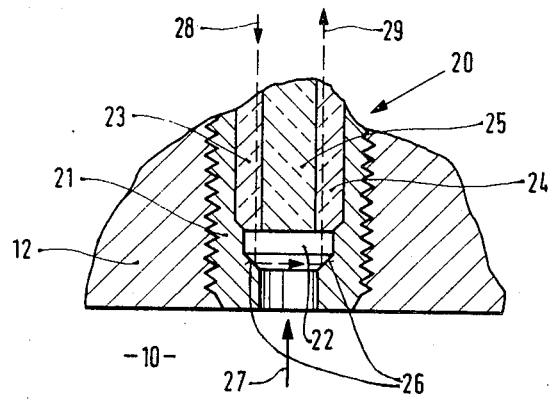
FIG. 2 is a fragmentary cross section through the cylinder block of an IC engine with an optical pick-up including reflection zones.

Embodiment of FIG. 2: A pick-up 20 is located in a housing 21 which may be similar to a spark plug housing. The housing 21 is formed with an antechamber 22 which fits against a window having three portion: a first portion 23, a second portion 24, and a third portion 25. Reflecting elements 26 are located opposite the surface of the window portion fitting against a projection 22. The light which is to be measured, namely as a result of combustion, enters through the antechamber in the direction of the arrow 27 and is received in the pick-up 20. Reference light is applied through the first portion 23 of the pick-up 20, as indicated by the arrow 28. The reference light 28 is received within the antechamber 22, is there reflected by the reflectors 26, and re-reflected into the pick-up 20 through the second portion 24, to leave the second portion 24 of the pick-up 20 as indicated by arrow 29. The portion 24 which receives the light in accordance with arrow 29 is coupled to the evaluation system. Independently of the light in portion 24, the measured or sensed light is applied through the third portion 25 of the window into the pick-up 20. As clearly seen in FIG. 2, reference light is applied from the first to the second portion 24 only, and not to the third portion 25; the measuring light—arrow 27—falls on all the portions. As will appear below, the light received from portions 24 and 25 can be selectively evaluated so that the signal derived from the actual sensed light—arrow 27—can be suitably weighed to allow for contamination or loss of transmissivity of the windows of the pick-up 20.

Figure 3:
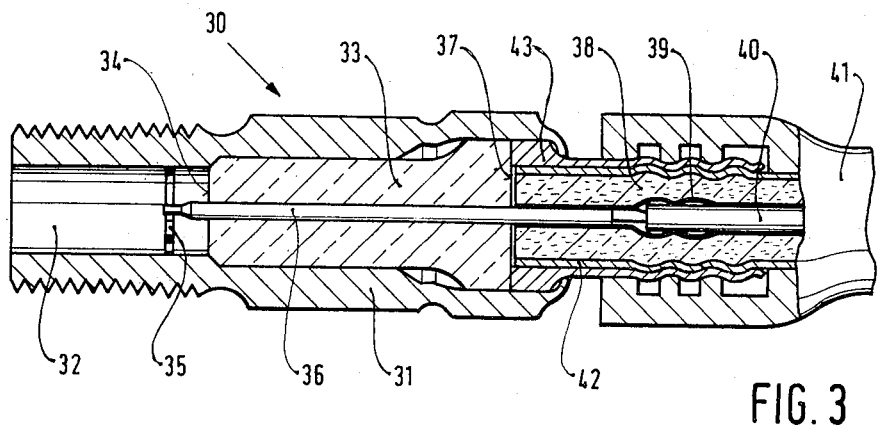
FIG. 3 is a longitudinal schematic cross section through an optical pick-up with a light source therein.
Figure 4A:
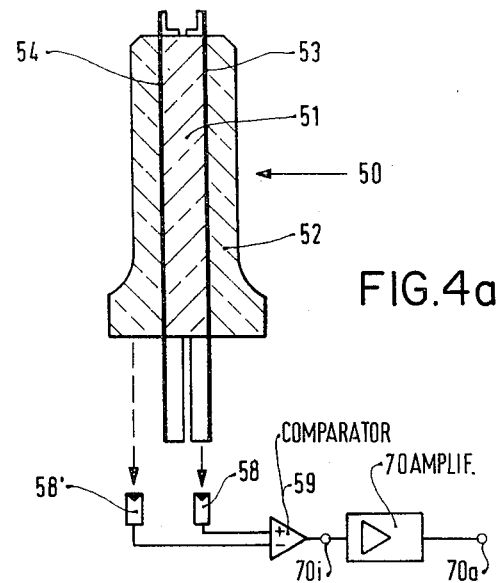
FIG. 4a is a schematic illustration of another embodiment of the arrangement of FIG. 3.
Figure 4B:
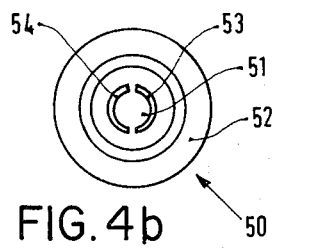
Figure 4C:
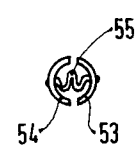
FIG. 4c and FIG. 4d are, respectively, end views of different filament locations to provide a reference light source.
Figure 4D:
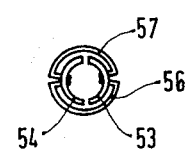

Embodiment of FIG. 3: Pick-up 30 again uses a housing 31 similar to a spark plug housing, and essentially of the same shape. It is formed with an antechamber 32. A window portion 33 closes off the antechamber 32. An incandescent filament 35 is placed ahead of the surface 34 facing the combustion chamber 10 of the window portion 33 within the antechamber 32. The incandescent filament 35 is supplied by electrical current over a central supply line 36, the other terminal being formed by the housing 31. The central supply line 36 extends axially through the sensor and is insulated by the window portion 33, customarily formed of glass or similar material. A light guide 38 is joined to the surface 37 opposite the combustion chamber. The connection 36 is joined to an electrical cable 40 which forms part of a combination plug element 41, also retaining an electrical connector 39. The light guide 38 of the combustion plug 41 is held in a sleeve-like holder 42 which is fitted into an outer holding sleeve 43, retained in the housing 31 by a rolled-over edge, a C-ring, or the like.

Embodiment of FIG. 4 (collectively): FIG. 4—collectively—shows various embodiments of a window portion 50 which may replace the window portion 33 of FIG. 3. The window portion 50—see FIG. 4a—has an inner portion 51 and an outer portion 52—with respect to the axis of the window 50. The subdivision of the portions 51, 52 is obtained by half-shells 53, 54, see FIG. 4b, which are electrically insulated from each other and positioned coaxially with respect to the axis of the window 50. FIG. 4b clearly shows this arrangement in an end view. Two different shapes of incandescent filaments may be used with this arrangement. For example, a filament 55—see FIG. 4c—can be placed across the two half-shells 53, 54; or two filaments 56, 57 can be wrapped around the half-shells, as seen in the end view of FIG. 4d. The filaments thus will receive current from the respective half-shells, to apply a reference light to the same regions which also receive the sensed light from the combustion event. The regions which are, however, shaded by the half-shells will receive only the light resulting from combustion. Applying a light sensitive element 58—FIG. 4a—to the inner portion 51, and a light-sensitive element 58' to the outer portion 52, and connecting the respective photoelectric transducers 58, 58' to a comparator or differential amplifier 59 connected to an amplifier 70, a signal can be obtained which will be representative only of the intensity of the measured or sensed light.

Figure 5A:
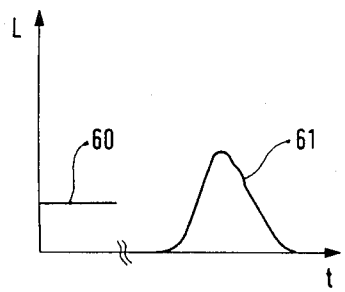
FIG. 5a is a diagram illustrating calibration in accordance with one system, and FIG. 5b calibration in accordance with another mode.
Figure 5B:
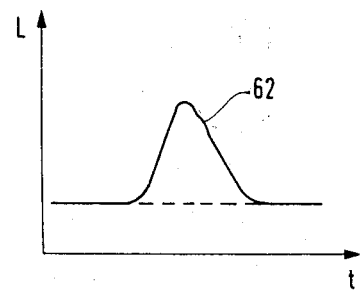

FIGS. 5a and 5b illustrate the intensity of light signals L with respect to time t. FIG. 5a illustrates the mode of operation in which normalization or calibration is carried out off-line, that is, in which the sensor is calibrated when no combustion light occurs. The light received by the light sensor is illustrated by curve 60, that is, a constant light signal corresponding to the reference light being applied to the sensor. As the motor is started, and when the reference light is disconnected, only the measured light shown in curve 61 will be received. FIG. 5b illustrates the mode of operation in which calibration is carried on-line, in which the reference light is continuously connected, which is illustrated by the superposition of the sensed light over the reference light, as shown by curve 62, in which the reference light alone is indicated in a broken-line portion of the curve 62.

In accordance with a feature of the invention, calibration can be carried out during the time when the motor is stopped, by forming a reference value from curve 60 (FIG. 5a) and storing the reference value in a suitable memory. Upon subsequent operation of the engine, the measured light in accordance with curve 61 is then normalized with respect to the reference.

This arrangement may have some disadvantages if the engine operates for a long period of time without interruption, so that the calibrating intervals will have a long time gap therebetween. Contamination of the windows facing the combustion chamber can occur during long uninterrupted operation of the engine, and the window can become so dirty that the previously normalized or calibrated values are more and more degraded. In accordance with a feature of the invention, therefore, calibration can be carried out during operation of the engine. The reference value is formed in the measuring window during a portion of the operating cycle of the engine when no combustion occurs. The measured light is then formed as a difference of the overall light and of the reference light, as described above in connection with the sensors of FIGS. 2 and 4. It is, of course, also possible to utilize light sources which react rapidly and provide a time window or strobing arrangement in which the reference light is extinguished when the measuring light occurs.

The light signals, after being transduced into electrical signals by a suitable transducer, such as an optically responsive diode, a light-responsive transistor, or the like, are evaluated in evaluation circuits in which the measured or sensed light signals are related to a reference value as determined by the reference light. One embodiment of such a circuit is shown in FIG. 6.

Figure 6:
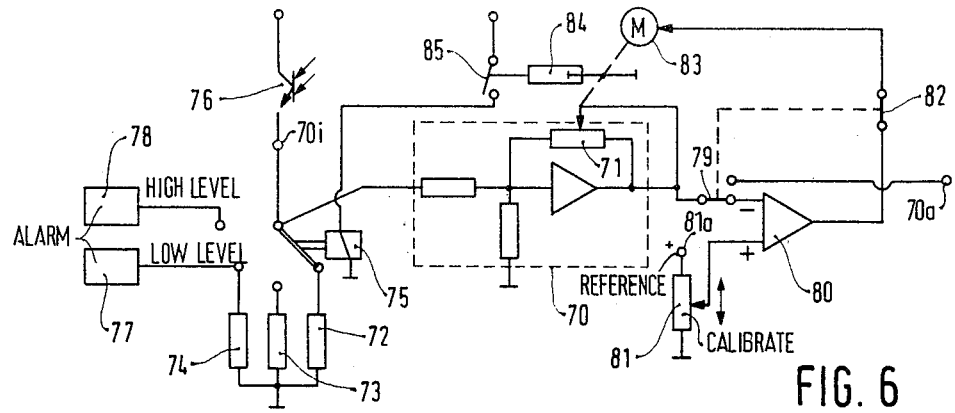
FIG. 6 is a schematic circuit diagram of an evaluation circuit to evaluate the signals derived from the pick-ups illustrated in FIGS. 1-4.

The evaluation circuit of FIG. 6 uses as a central component a self-adjusting amplifier 70 having a controllable feedback resistor 71 and a plurality of individually selectable input resistors 72, 73, 74 which can be selectively connected by a suitable stepping selector switch 75. Only three input resistors are shown although, of course, a substantially larger number can be used and the stepping network 75 itself is shown only schematically and equivalent circuitry can be employed. The feedback resistor 71 is indicated only symbolically to represent a continuously controllable amplification factor of the amplifier 70, and the input resistors 72, 73, 74 are symbolic for a range switching of the amplification factor of the amplifier 70. It is, of course, also readily possible to control range switching by a continuously variable resistor, for example by utilizing an electronically controlled resistor, or to change the input resistance value by switching over a logic matrix.

The input signal to the amplifier 70 is supplied from a light-sensitive coupling element 76 which is contained within one of the pick-ups illustrated in FIGS. 1–4, respectively. It is connected to amplifier input 70i, FIGS. 4a, 6, 7.

The input resistors 72, 73, 74 are so connected that they are switched in clockwise direction from the lowest to the highest amplification range. In the highest amplification range in which the input resistor 74 is connected, a first or low-level alarm 77 is additionally connected. The very highest amplification possible of the amplifier is obtained by switching of the network to a terminal from a high-level alarm unit 78. The output signal from amplifier 70 is connected over a transfer switch 79 to a comparator 80, forming a quotient between the output signal from the amplifier 70 and a controllable input from a calibration potentiometer 81, which receives a reference potential at terminal 81a. The output signal from the quotient circuit 80 forming, in effect, a divider or comparator, is connected over a further terminal 82 of the transfer switch 79 to a motor 83 which controls the position of a tap on the feedback resistor 71. When the feedback resistor 71 reaches a terminal position, the motor additionally controls a contact terminal 85 in such a manner that, when the amplification of amplifier 70 is at the highest then possible level due to the setting of the feedback resistor 71, the stepping relay 75 is energized to step the terminal for one step from the input resistor 72, for example, to the next input resistor 73—in clockwise direction; when the lowest amplification level is reached, the stepping is in the opposite direction.

Operation of circuit of FIG. 6: When the circuit is in the calibrating mode, transfer switch 79 with the contact terminal 82 is in the position shown in FIG. 6. During calibration, the light-sensitive element 76 will receive only the reference light. This will be the case when, for example, in accordance with the calibration of FIG. 5a, the engine is stopped; or, in accordance with the mode of FIG. 5b, the engine is operating and the light received by the element 76 occurs during a measuring or strobing window when the ignition chamber is dark. The calibrating potentiometer 81 is set to provide a predetermined reference level for the "dark" output, in which only the reference light is applied to the photosensitive element 76. For initial calibration of the unit, the pick-up should be new or clean. At that point, the amplification factor of the amplifier is set at the lowest level, and the reference level of potentiometer 81 is suitably adjusted, so that motor 83 sets the value of the feedback resistor 71 for minimum amplification with the stepping switch or relay 75 also set at minimum amplification.

If the output signal of the amplifier due to increasing contamination of the window becomes less than the reference value, the amplification of amplifier 70 will be automatically set by the motor 83, by adjustment of the feedback resistor 71, until the output signal of amplifier 70 again matches the reference value set on potentiometer 81. If the adjustment control of the feedback resistor 71 is no longer sufficient to raise the amplification of amplifier 70, the slider on the potentiometer 71 will engage the movable terminal of switch 84, causing pull-in of relay 85 and stepping of relay 75 by one step to the next higher input resistance 73, thus again raising the amplification of amplifier 70 to the next higher amplification level. Of course, this will cause a resetting of the potentiometer position of potentiometer 71, that is, motor 83 will return the potentiometer setting of potentiometer 71 to a higher degree of negative feedback. The motor 83, thus, returns the feedback resistor so that, as contamination and soiling of the window increases, the motor 83 can again raise the amplification of amplifier 70, continuously, by adjustment of feedback resistor 71 until the stop at switch 84 is again reached, and the stepping relay 75 steps once more.

This continuous switch-over of the amplification factor of the amplifier is continued until, at the highest amplification level, the input resistor 74 is connected. When this connection is made, the low-level alarm 77 is also triggered. The drawing shows, schematically, only a single terminal, although the terminal to which alarm 77 is connected can be an additional switching contact on the stepping relay 75. This alarm will be maintained to provide an indication to the operator that the limit of amplification has been reached which can be introduced electronically to compensate for soiling of the window, so that the sensor windows should be cleaned, or the sensors replaced. If this is not done, and the motor 83 again changes the amplification level of amplifier 70, by control of the feedback potentiometer 71, to reach yet another step, the stepping relay 75 will reach the terminal from high-level alarm 78 which will indicate that no further calibration is possible and that, from here on, the output from the sensor, as transduced by the light-sensitive element 76, will not properly be representative of light due to combustion events within the combustion chamber.

When the system of FIG. 6 is in the measuring mode, the transfer switch 79 is changed over to interrupt the terminal 82 and connect the output from amplifier 70 directly to the output terminal 70a. The amplifier 70 is calibrated, so that light received by the element 76 is normalized to the reference value determined by the calibration potentiometer 81. Of course, in accordance with this mode of operation, no reference light should reach the element 76 during the measuring phase; alternatively, the amplifier 70 may receive a difference value as described in connection with FIGS. 2 and 4 above, that is, will receive a light value from which the reference light has been eliminated.

FIG. 6 illustrates, for convenience of explanation, the various switches and relays in mechanical form; of course, the transfer switch 79 and the terminal 82 can be electronically instrumented; this is particularly suitable if the operation of the system is so controlled that during a measuring interval or window occurring during a "dark" phase of operation of the combustion chamber, the system is being calibrated, and during a subsequent measuring phase, a normalized output is transmitted to output terminal 70a during the following measuring phase.

Figure 7:
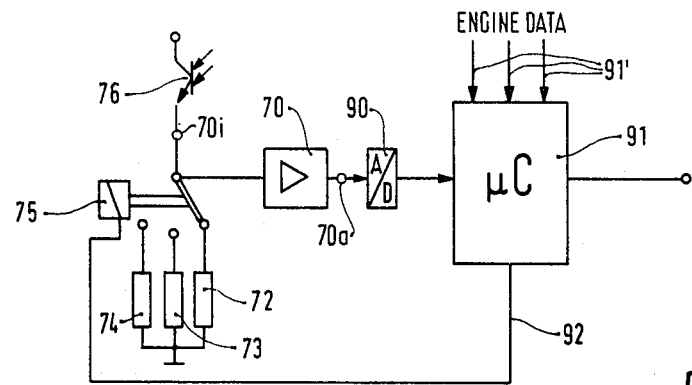
FIG. 7 is a circuit arrangement similar to FIG. 6, in which the evaluation is carried out digitally.

Evaluation circuit, FIG. 7: The output signal of amplifier 70, which can be similar to that of FIG. 6, is applied to an analog-digital converter 90. The digital output is applied to a microcomputer or microprocessor 91. The microprocessor 91 controls the output line 92 connected to the stepping relay 75 by providing output signals to step the relay 75 similarly to the stepping by switch 85 under control of the end stop 84 when the slider of potentiometer 71 is moved by motor 83—FIG. 6.

During the calibration interval, the light values applied to the amplifier 70 are converted into digital output numbers in the A/D converter 90 and entered into a data storage register of the microcomputer 91. The microcomputer forms the average value of several subsequently stored values, and simutaneously checks if these individual values are above or below a predetermined threshold level. In either case, the control line 92 is energized to step the stepping switch 75 in clockwise, or counter-clockwise direction, respectively. The arithmetic means, which is formed by engine operating conditions operating in a predetermined controlled state is used as a calibration value, and, during the measuring phase, the measured output is divided by the calibration value, and thereby normalized. Information regarding motor operating conditions, that is, engine data, are applied over inputs 91' to the microcomputer 91. Typical input engine data are speed, load, temperature, and the like. Depending on engine input data, the intervals are determined during which the motor operating condition is stable, so that a new calibration value can be determined during such stable operating conditions, thereby eliminating transients from effecting the normalization value. If rapid changes of operating conditions occur, microcomputer 91 can apply an average weighted reference value for the period of time shortly after transient conditions have ceased. The basis for such an average theoretical value is prior experience of engine conditions. Microcomputers capable of such adaptive control utilizing prior experience as a basis to form a theoretical reference value are well known.

The mode of determining engine operating condition or, rather, the change in engine condition, is not necessary for operation. It does, however, prevent hunting of the normalized measuring signal, particularly in case the engine condition changes comparatively rapidly.

Reference light is introduced by light sources. Light sources, particularly incandescent filaments, are subject to change during use. Even if the supply voltage is assumed to be unvarying, which is a reasonable assumption for most automotive engines under extended operating conditions, the light output will change with changes of resistance conditions of incandescent filaments. The resistance conditions, usually increases in resistances, can be determined by sensing the heating current for the filament. It is, therefore, desirable to hold the light output of the filament at a standard level by controlling the power supplied to the light source.

Figure 8:
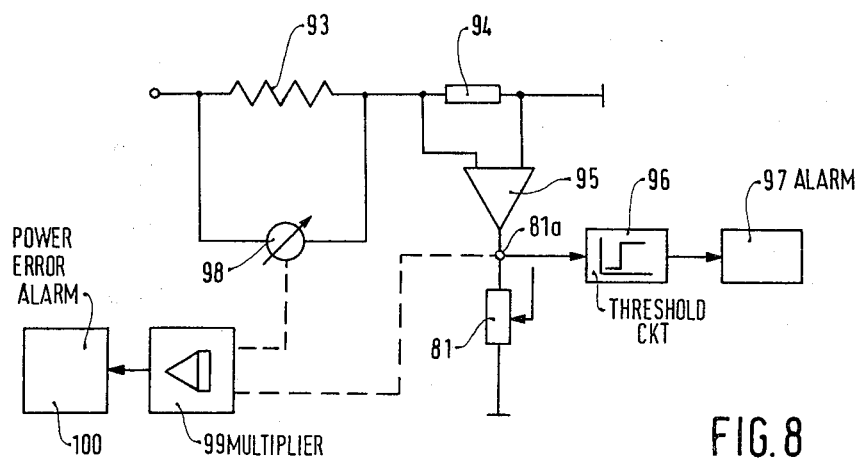
FIG. 8 is a circuit arrangement to determine aging of the reference light source.

In accordance with an embodiment of the invention, the heating current supplied to the light source, or the heating power supplied thereto, respectively, is used to correct the calibration value. FIG. 8 illustrates such a correction circuit. The incandescent filament illustrated, for example, in connection with FIG. 4 (collectively) is shown in FIG. 8 schematically as resistor 93. A measuring resistor 94 is connected serially with the filament 93, and the measuring voltage dropped thereacross is applied to an amplifier 95 which, in turn, provides the supply voltage to the calibration reference potentiometer 81 (see FIG. 6). The output of the amplifier 95 is applied, additionally, through a threshold switch 96 to a third alarm 97. The output of the amplifier 95 can, additionally, be applied to a multiplier 99 which receives, as another input, the voltage across the incandescent filament 93. The multiplier 99 is connected to a fourth alarm 100.

Operation, circuit of FIG. 8: Amplifier 95, connected to sense the current flowing through the filament 93 and providing an output to the calibration potentiometer 81, senses changing in heating current flowing through the filament 93, proportionately, changes the reference value applied to the calibration potentiometer 81. Thus, change in the light output of the filament 93, due to changes in current flowing therethrough, is compensated by adjusting the reference voltage applied to the calibration or reference potentiometer 81. The threshold switch 96 additionally senses if the current decreases below a predetermined level and can trigger the alarm, or provide an output indication that the current is low, for example that the filament 93 is burned out or has reached a value at which no further suitable reference light can be obtained therefrom. Alarm 97, thus, is a current error alarm, namely indicating that the current flowing through the heating filament 93 can no longer be compensated for. The multiplier 99 multiplies current with voltage across the filament 93, and thus is a power error alarm indicating if the heating power and thus the overall light output is insufficient. When predetermined threshold levels are exceeded, that is, if the multiplication factor of multiplier 99 reaches a certain level, the alarm 100 is triggered. The circuit 98, 99, 100 is not strictly necessary and thus the connections from the voltage sensing element 98 and the output of amplifier 95 are shown in broken lines. Terminal 81 of FIG. 8 corresponds to the + terminal to which reference potentiometer 81 of FIG. 6 is connected.

Various changes and modifications may be made, and features described in connection with any one of the embodiments may be used with any of the others, within the scope of the inventive concept.

We claim:

1. Optical sensor system to obtain an optical signal representative of characteristics of combustion events in a combustion chamber, particularly a combustion chamber (10) of an internal combustion engine having a tubular housing formed with means for securing the housing in a wall (12) defining at one side thereof said combustion chamber;

light pick-up means (13, 20, 30) retained in the housing and having a sensing end portion in optical communication with the combustion chamber at one end thereof;

light-responsive means (76) being coupled to the pick-up means;

and comprising, in accordance with the invention, means (15, 16; 23, 24, 28, 29; 35; 53, 56, 57) for applying reference light to the pick-up means;

and signal evaluation means (70, 80, 91) coupled to the light-responsive means and receiving both said reference light and the light generated as a consequence of a combustion process in the combustion chamber, and normalizing the sensed light derived from the combustion process with respect to the reference light to obtain an output representative of absolute light regardless of contamination of the light pick-up means upon continued exposure thereof to combustion processes or events.

2. System according to claim 1, wherein (FIG. 1) said means applying a reference light comprises placing a light source (15, 16) in the combustion chamber in position for radiation of light to the pick-up means.

3. System according to claim 1, wherein (FIG. 2) the means applying the reference light comprises light guide means (23) coupled to a source of reference light (28) and surrounding the pick-up means;

and reflecting means (26) are positioned to receive light from the source of reference light introduced into the light guide means and reflecting said light into the pick-up means having a central light guide portion positioned recessed within the tubular housing to define an antechamber (22) in the housing;

said light guide means coupled to the source of reference light forming, at least in part, a surrounding outer portion, optically insulated from the pick-up portion;

and the reflective means (26) are located within the antechamber (26).

4. System according to claim 1, wherein (FIG. 4) the means for applying the reference light comprises a window portion (33, 50) formed on the pick-up means;

and a reference light source (35, 55, 56, 57, 93) secured to said housing and positioned in light-transmissive relationship to said window.

5. System according to claim 4, wherein said window portion is positioned in the tubular housing recessed from the end thereof to form an antechamber;

and the reference light source (35, 55, 56, 57, 93) is an incandescent filament located within said antechamber (32).

6. System according to claim 4, wherein (FIG. 4a) said window portion (50) comprises two optically separate portions (51, 52);

and said reference light source (55; 56, 57) is positioned to apply reference light to only one of said portions, the other portion being shaded from said reference light.

7. System according to claim 6, wherein one of said portions comprises an axially extending rod-like element (51), two electrically insulated and electrically conductive half-shells (53, 54) being positioned to surround said axially extending rod-like element, the other window portion (52) being positioned outside of said shell, and wherein said reference light source comprises an incandescent filament electrically connected to at least one of said half-shells.

8. System according to claim 7, wherein (FIG. 4) the signal evaluation means includes a comparator or difference forming element (59) connected to receive the signals of the optically separate window portions (51, 52) and providing an output representative of the difference of the light signals;

and an amplifier (70) having a variable amplification factor connected to receive the comparison or difference output signal, said variable amplification factor amplifier including an amplification control circuit (80, 82-85) and means (81) providing a reference level to conrol the amplification factor of said amplifier (70) and provide a predetermined output thereof when subjected to input signals derived as a consequence of reference light applied by said reference light applying means to the pick-up means.

9. System according to claim 1, wherein said combustion chamber (10) comprises the combustion chamber of an internal combustion engine;

and wherein said signal evaluation means is connected to said engine and operative to evaluate light received from the reference light applying means when the engine is stopped.

10. System according to claim 1, wherein said combustion chamber (10) comprises the combustion chamber of an internal combustion engine;

and wherein said signal evaluation means is connected to said engine and operative to evaluate light received from the reference light applying means while the engine is operating, and during time intervals when no combustion events generating light occur in the engine.

11. System according to claim 1, wherein said evaluation means comprises a self-adjusting amplifier (70) having a variable amplification factor;

means (81) providing a reference level;

and an amplification control circuit (80, 82-85) connected to said variable amplification factor amplifier and controlling the amplification factor thereof to provide a predetermined output when subjected to an input signal derived as a consequence of reference light applied by the means for applying the reference light to the pick-up means.

12. System according to claim 11, further comprising (FIG. 8) means sensing light output of said reference light applying means, and deriving a control signal, said control signal being connected to said reference level providing means (81) to modify the reference level in accordance with light emitted by said reference light applying means.

13. System according to claim 11, further comprising alarm means (77, 78) connected to said variable amplification factor amplifier and providing an alarm output when the amplification factor of said amplifier reaches a predetermined limit.

14. System according to claim 8 or 11, wherein said amplification control circuit comprises a continuously operating feedback amplification control (71; 83) effective to adjust the amplification factor of said amplifier over a limited range, and stepped amplification control means (72-74; 75) effective to adjust the amplification factor of said amplifier over steps in excess of the amplification level change effected by said continuously operating feedback amplification control;

and alarm means (77, 78) connected to said stepped amplification control means and providing output alarm signals when the amplification of said variable amplification factor amplifier reaches at least one predetermined level.

15. System according to claim 14, further including (FIG. 7) an analog/digital converter (90) and a digitally operating microcomputer (91) connected to the output (70a) of the amplifier (70);

input means (91') controlling read-in and storage of the output signal of the amplifier (70) in predetermined time intervals, the microcomputer being connected and arranged to form an arithmetic value of sequentially entered and stored output signals derived from the amplifier (70) and providing stepping control signals to said stepped amplification control means of the amplifier when the averaged signals reaches predetermined levels.

16. System according to claim 1, further including (FIG. 8) circuit means connected to the reference light applying means to maintain the light output of said reference light applying means at a constant level.

17. System according to claim 16, further including light power alarm means (100) connected to said circuit means to provide an alarm when the light output decreases below a predetermined level.

18. System according to claim 16, wherein said reference light applying means includes an electrical resistance element (93);

and said circuit means includes current sensing means (94, 95) sensing current flow through said resistance means, and voltage sensing means (98) connected across said resistance means (93);

and power meter means, including a multiplier and an alarm (100), are connected to said current and voltage measuring means, respectively, to provide an alarm signal if the power applied to said resistance means drops below a predetermined leve.

* * * * *